United States Patent
Ochoa

(10) Patent No.: US 9,434,221 B2
(45) Date of Patent: Sep. 6, 2016

(54) TIRE MACHINE CLAMPING SYSTEM

(71) Applicant: Sandy Ochoa, Alamogordo, NM (US)

(72) Inventor: Sandy Ochoa, Alamogordo, NM (US)

(*) Notice: Subject to any disclaimer, the term of this patent is extended or adjusted under 35 U.S.C. 154(b) by 379 days.

(21) Appl. No.: 14/268,031

(22) Filed: May 2, 2014

(65) Prior Publication Data

US 2015/0314659 A1    Nov. 5, 2015

(51) Int. Cl.
*B60C 25/00*  (2006.01)
*B60B 30/06*  (2006.01)
*B60C 25/05*  (2006.01)
*B23B 31/16*  (2006.01)

(52) U.S. Cl.
CPC ....... *B60C 25/0539* (2013.04); *B23B 31/1627* (2013.01); *B60C 25/0527* (2013.04)

(58) Field of Classification Search
CPC ............ B60C 25/0529; B60C 25/053; B60C 25/0527; B23B 31/1627; Y01T 279/1986
USPC ...................................................... 157/16, 21
See application file for complete search history.

(56) References Cited

U.S. PATENT DOCUMENTS

| | | | | |
|---|---|---|---|---|
| 1,804,222 | A * | 5/1931 | Mascuch | B60C 25/132 157/1.26 |
| 4,196,766 | A * | 4/1980 | Leeper | B60C 25/0545 157/1.26 |
| 4,393,914 | A * | 7/1983 | Leeper | B60B 30/06 157/1.2 |
| D535,313 | S * | 1/2007 | Cunningham | D15/199 |
| 8,347,934 | B1 * | 1/2013 | Cunningham | B60B 30/06 157/16 |
| 2013/0075044 | A1 * | 3/2013 | Bertrand | B60C 25/0539 157/1.17 |

* cited by examiner

*Primary Examiner* — Bryan R Muller
(74) *Attorney, Agent, or Firm* — Dennis F. Armijo

(57) ABSTRACT

Apparatuses and methods for adapting a tire machine to accept small wheel assemblies. A first embodiment includes a cross shaped guide with clamp adapters that glide in unison to engage and disengage the small wheel assembly via a rim hooking structure that extends the reach of the OEM tire clamps. Each clamp adapter is set over the OEM tire clamps and is engaged or closed via an engagement clip and opened or disengaged via a disengagement clip disposed on each clamp adapter. Another embodiment includes individual clamp adapters that are slid over the OEM tire clamps to extend the reach of the OEM tire clamps. A stop hook is disposed on the clamp adapters to engage a clamp hook on the OEM tire clamp when the tire machine is activated which engages a raised adapter hook on each clamp adapter to the small wheel assembly rim edge.

11 Claims, 9 Drawing Sheets

TIRE MACHINE CLAMPING SYSTEM

RELATED APPLICATIONS

This application claims the benefit of U.S. Provisional Application No. 61/821,280, filed May 9, 2013, the specification of which is incorporated herein by reference. This Application is also a Continuation-In-Part to U.S. patent application Ser. No. 14/146,921, filed Jan. 3, 2014, the specification of which is incorporated herein by reference.

BACKGROUND OF THE INVENTION

1. Field of the Invention (Technical Field)

This disclosure is related to tire tools and more particularly to an apparatus, method, and system for providing an adapter for a tire machine to clamp onto smaller diameter wheels.

2. Background Art

Presently, tire machines are designed to secure only wheel assemblies that are for conventional motor vehicles, such as automobiles and trucks. Thus, the clamping mechanisms for most, if not all machines, can handle wheel assemblies from approximately thirty-eight inches (38") to a minimum of ten inches (10"). For smaller diameter wheel assemblies, there are adapters that are specifically designed for each diameter size. The adapters require complex bolting procedures to assemble and are designed for a limited number of rim configurations. There is a need for a universal adapter for use in any and all small wheel assembly sizes that effectively clamps and centers these smaller wheel assemblies.

SUMMARY OF THE INVENTION

Disclosure of the Invention

The claimed invention overcomes the shortcomings of the prior art by providing an adapter to be mounted on existing clamps of a tire machine. An adapting apparatus and wheel gripping device that serves the purpose of clamping to smaller than standard rims, thereby extending the range of usefulness of a common semi-automatic rim clamp tire machine. This adapting apparatus and wheel gripping device is designed for use on semi-automatic tire machines and adaptively incorporates both the existing clamping device and the rotary power drive of the existing rim clamp tire machine. The adapting apparatus and wheel gripping device connects to an existing multi-point table common to semi-automatic, rim clamp, and tire machines. The adapting apparatus does not require modification to the existing tire machine and is merely placed on the existing clamping mechanism. This connection serves to stabilize and support the extending wheel grips and to allow functionality in a multi-directional, self aligning motion, along the linear guide elements. The connection is achieved through a number of adjustable clips that fasten to the existing tire machine clamps for retracting and protracting said extending wheel grips under the power of the existing semi-automatic, rim clamp, tire machine along the linear guide elements. The linear guide elements further act as a deck and support structure for the wheel until it is secured by the extending clamps. This adapting apparatus and wheel gripping device does not require tools for either installation or removal. The device can be used on many small lawn and garden tires, as well as smaller ATV and hand truck tires, thereby; extending the range of smaller tires that can be demounted and mounted on a common semi-automatic, rim clamp, tire machine.

Also disclosed is an alternative clamp adapter that is similar the one described above except that it has dual hooking portions or rim clamps affixed to each clamp adapter. This embodiment is preferable for smaller wheel assemblies to avoid damaging the rim by dividing the forces to squeeze against the rim by the extra hooking portions. In addition due to the extra rim clamps, the rim is centered on the tire machine more efficiently when activated.

In a second embodiment, individual clamp adapters are disposed on each OEM clamp on the tire machine. These clamp adapters fit over, and are secured to each OEM clamp whereby the gripping portion of the clamp adapter extends beyond the OEM gripping portion to secure small wheel assemblies. Again, the novel clamp adapters require tools for installation or removal because they are configured for placing over the OEM clamp and are secured by the OEM gripping portion and the partial encasement of the clamp adapters of the OEM clamp.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
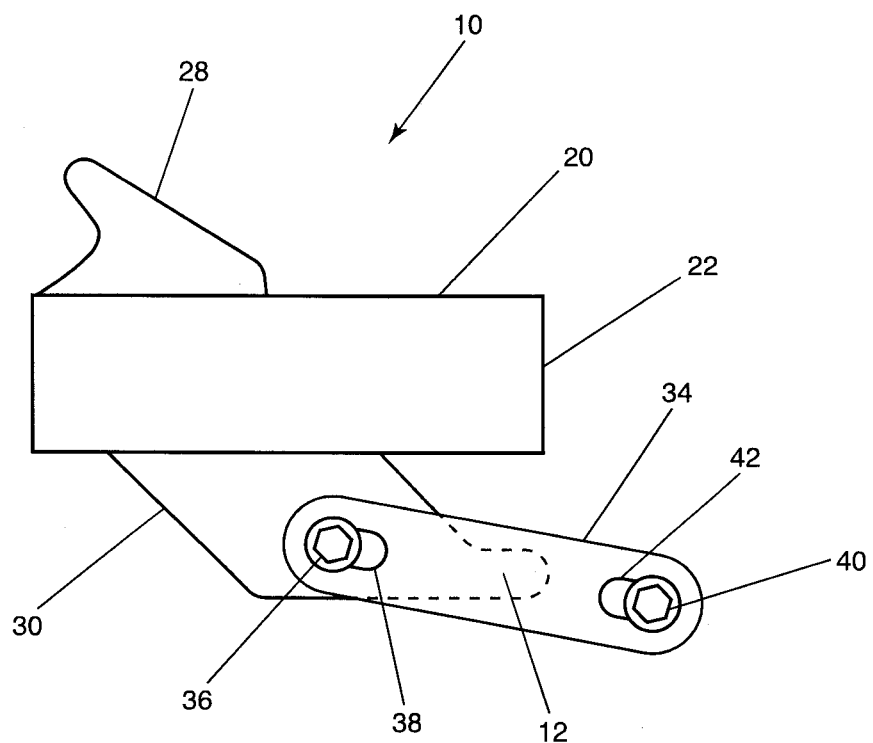
FIG. 1 illustrates a single clamp adapter not affixed to the cross assembly.

FIG. 1 shows a single clamp adapter 10 for the first embodiment. In this embodiment at least four clamp adapters are used to work in unison with at least four OEM clamps, as further described below. Each clamp adapter 10 has a housing 20 that has an aperture or hollowed portion 22 for insertion of cross shaped linear guides 24. This configuration allows each clamp adapter 10 to slide towards a wheel assembly 18 or away from the wheel assembly 26 when the tire machine is activated or deactivated, as shown in FIGS. 1, 2, and 3. Each clamp adapter 10 also has a hooking portion 28, which is preferably a V shaped member or the like to engage a rim edge. Hooking portion 28 can be an integral part of housing 20 or affixed to housing 20 by well-known methods, such as welding or bolting.

Figure 2A:
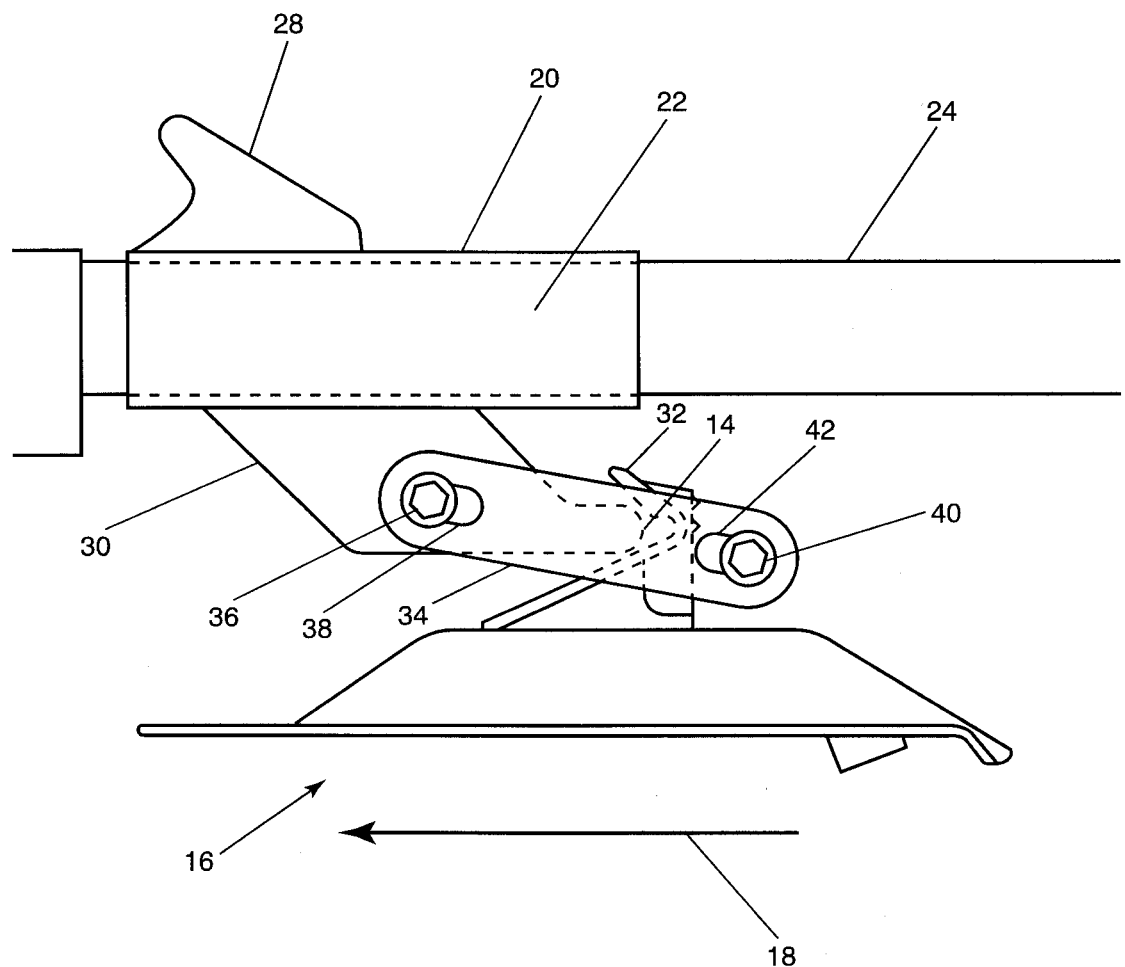
FIG. 2A illustrates the preferred clamp adapter affixed to an existing tire machine clamp when the tire machine is activated to clamp a wheel assembly.
Figure 3:
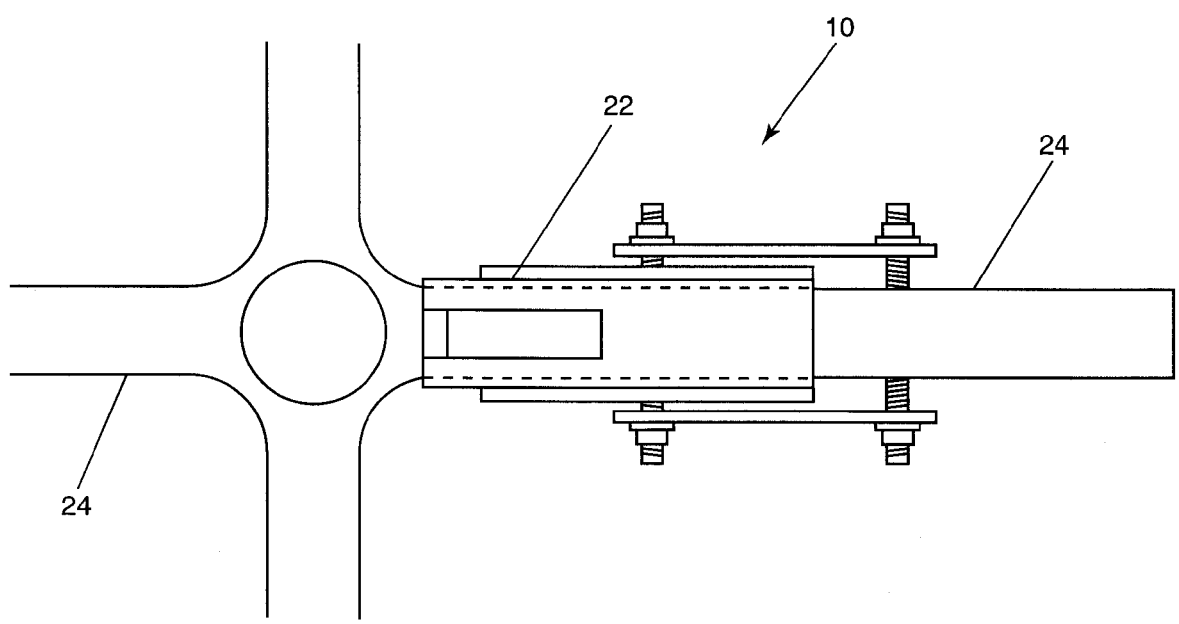
FIG. 3 is a top view of the clamping system showing a single clamp adapter.

Clamp adapters 10 each have a tongue 12 which is configured to fit into the V shaped catch 32 of the existing or OEM clamp 16 so that when the tire machine is protracted or activated to clamp on a wheel assembly, OEM clamp 16 pushes clamp adapter 10 towards the wheel assembly 18, as illustrated in FIG. 2A. Each tongue 14 has an extension portion 30 that is optimized to allow tongue 14 to engage V shaped catch 32 to avoid interference with guides 24 and housing 20. Extension portion 30 can also be an integral part of housing or affixed to housing by well-known methods.

Figure 2B:
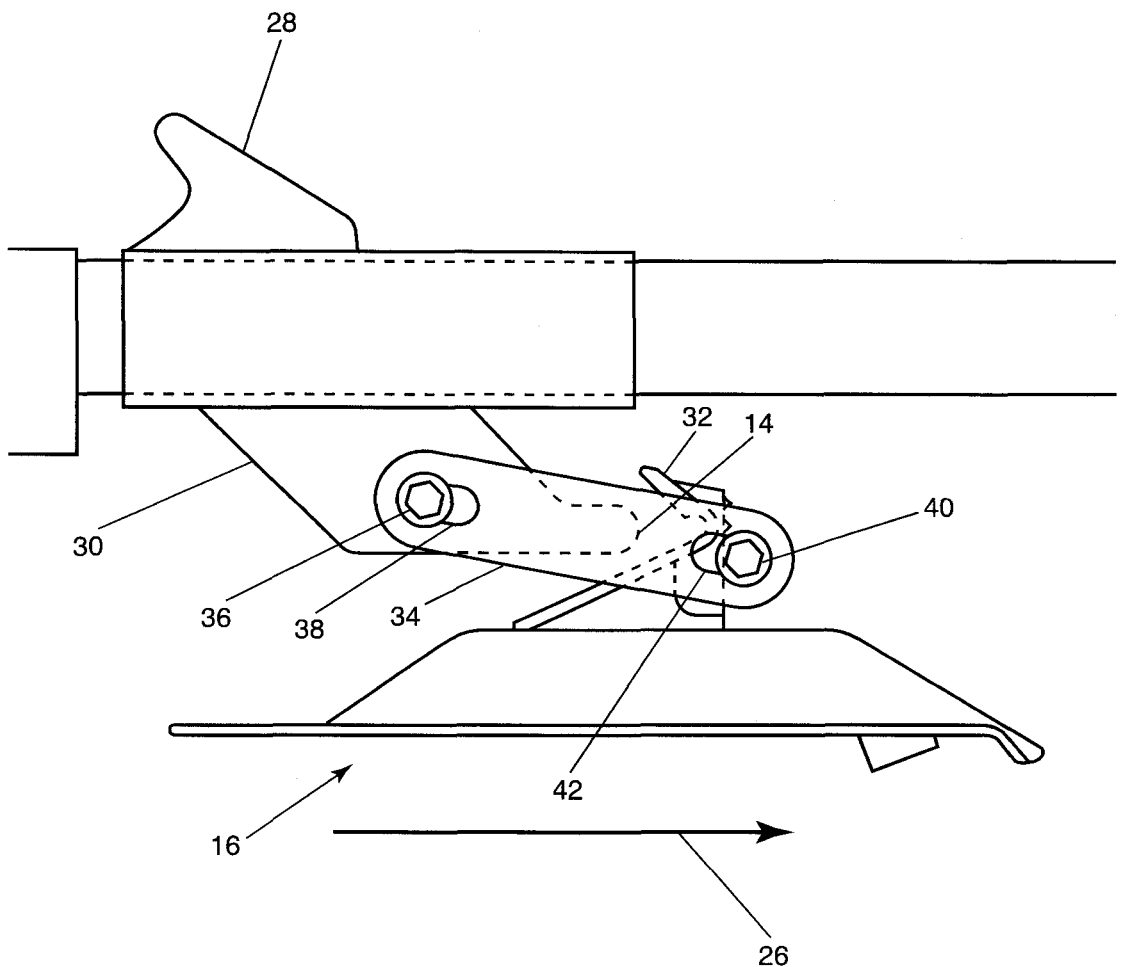
FIG. 2B illustrates the preferred clamp adapter affixed to an existing tire machine clamp when the tire machine is deactivated to release a wheel assembly.

Removably affixed to extension portion 30 is pivoting arm 34. Pivoting arm 34 is affixed to extension portion 30 via bolts 36. First pivoting arm aperture 38 can be slotted to allow for free movement of pivoting arm 34. Pivoting arm 34 also has a deactivating bar 40, which is loosely affixed through second pivoting arm aperture 42. Deactivating bar 40 can be a bolt or similar apparatus that is loosely affixed through second pivoting arm aperture 42, which can also be a slotted aperture. Deactivating bar 40 is configured to catch below the V shaped catch 32 on the back end or opposite end so that when the tire machine is retracted or deactivated, gravity will pull the deactivating bar below the back end of V shaped catch 32, engaging each housing 20, and moving all of the housings away from the wheel assembly 26, as shown in FIG. 2B.

Figure 4:
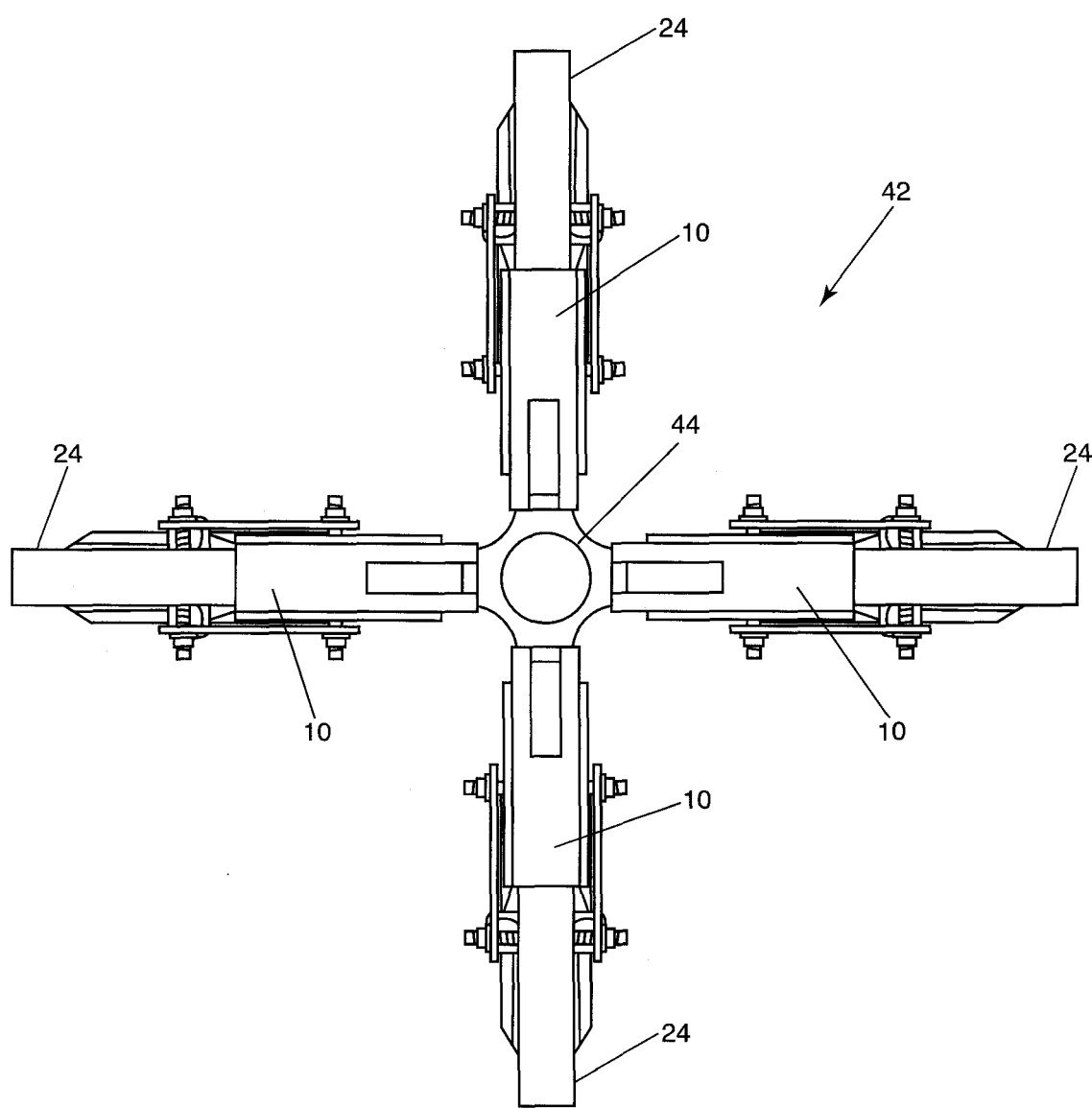
FIG. 4 is a top view of the clamping system showing four clamp adapters.
Figure 5:
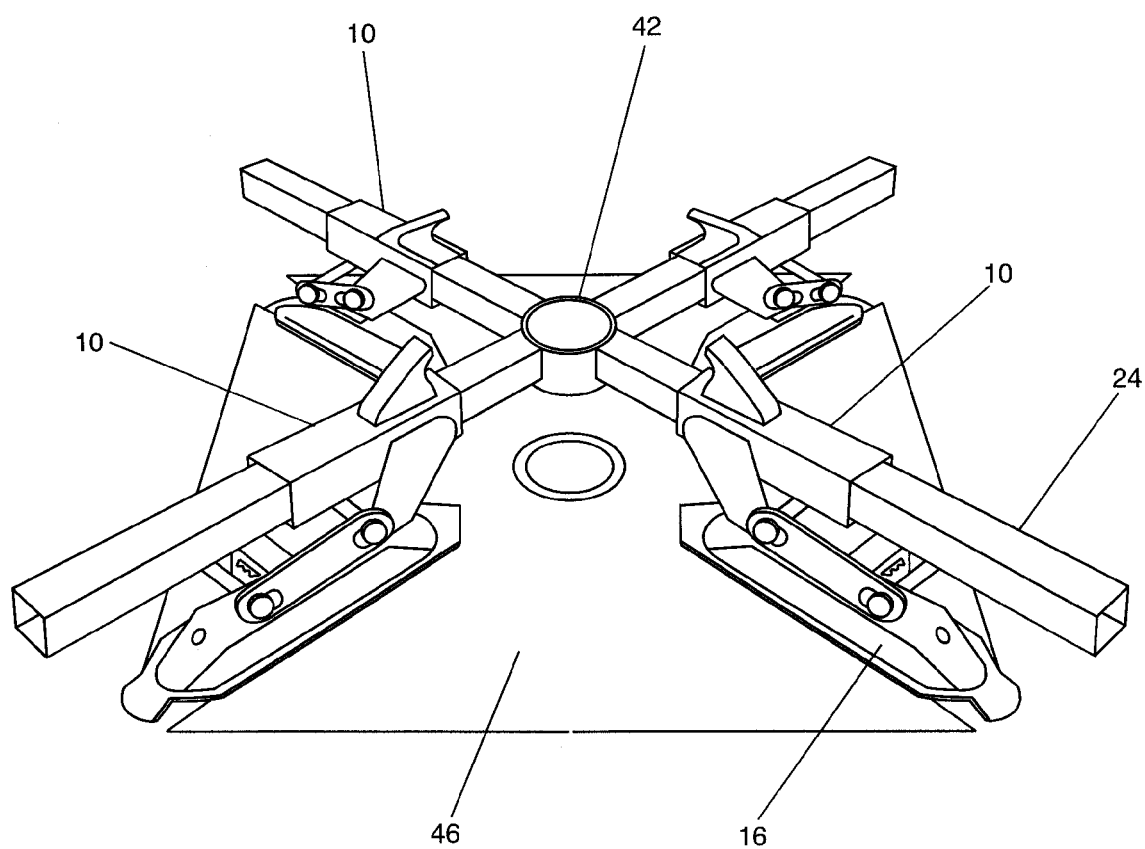
FIG. 5 is a perspective view of FIG. 4.

FIG. 3 shows a top view of cross shaped linear guides 24 inserted into a single clamp adapter 10. FIG. 4 shows the preferred adapter clamping system 42 with cross shaped linear guides 24 inserted into their respective clamp adapters 10. Cross shaped linear guides preferably comprise of a hollow centerpiece 44. FIG. 5 shows a perspective view of FIG. 4. When all four clamp adapters 10 are affixed to respective existing clamps 16, as described above, and tire machine 46 is activated to close existing clamps 16, all affixed clamp adapters 10 move in unison towards hollow centerpiece 44, due to V shaped catch 32 of the existing or OEM clamp 16 pushing against tongue 12 enabling movement of each clamp adapter 10 on cross shaped linear guides 24. Due to linear guides 24, the adapter clamp system 42 can accommodate any wheel assembly smaller than twenty one inches (21"). When the wheel assembly needs to be removed, tire machine 46 is deactivated, causing a back end of existing clamp 16 to push against deactivating bar 40 in each clamp adapter 10, thus opening clamp adapters 10 in unison. Cross shaped linear guides 24 make the clamping action similar and universal for each clamp adapter 10 and also provides for a centering of the wheel assembly.

Figure 6:
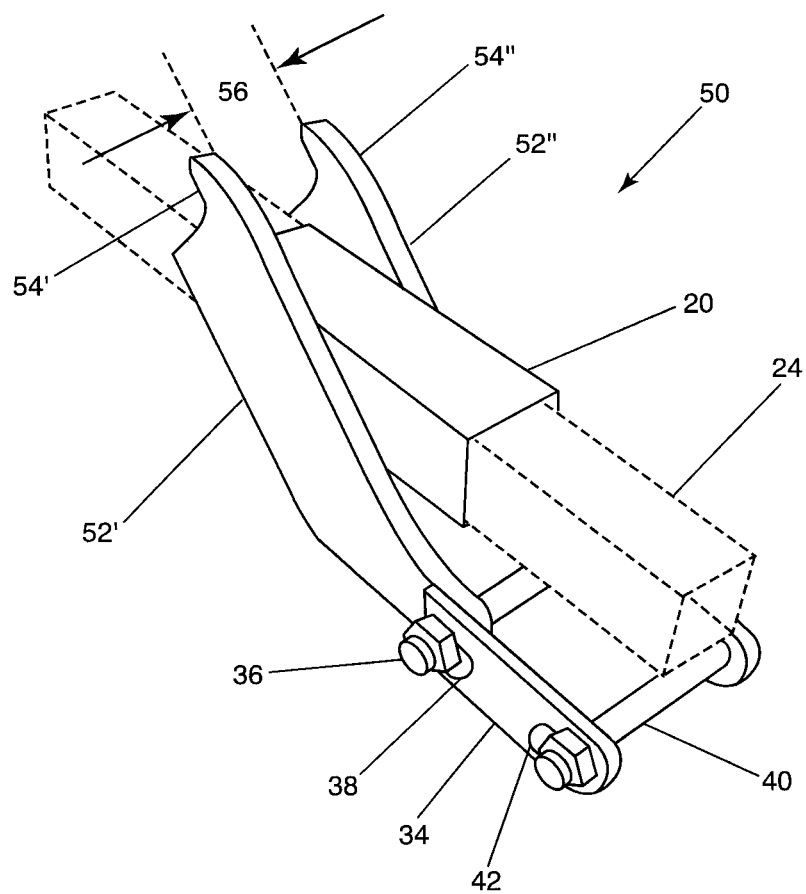
FIG. 6 is a perspective view of the dual rim clamp adapter.

FIG. 6 shows an alternative embodiment of a dual rim clamp adapter 50 with two hooking members. This embodiment has a similar housing 20 that glides back and forth on linear guides 24. Disposed on housing 20 are left hand extension 52' with rim clamp 54' and right hand extension 52" with rim clamp 54". Each of the rim clamps 54' and 54" are spaced apart due to the width of housing 56. Each extension 52' and 52" has an aperture for affixing pivoting arm 34 via bolts and nuts 36 or other well-known affixing method. As described above, pivoting arm 34 also has a deactivating bar 40, which is loosely affixed through a second pivoting arm aperture. Deactivating bar 40 can be a bolt or similar apparatus that is loosely affixed through the second pivoting arm aperture, which can also be a slotted aperture. Deactivating bar 40 is configured to catch below the V shaped catch 32 so that when the tire machine is deactivated, gravity will pull the deactivating bar below the V shaped catch 32, engaging each housing 20 and moving all of the housings away from the wheel assembly 26, as shown in FIG. 2B. This embodiment is preferable for smaller wheel assemblies because it limits the force applied to the rim edge by providing additional pressure points due to the additional rim clamps, thereby preventing damage to the rim. In addition, due to the additional rim clamps, the wheel assembly is centered on the tire machine more easily and efficiently.

Figure 7A:
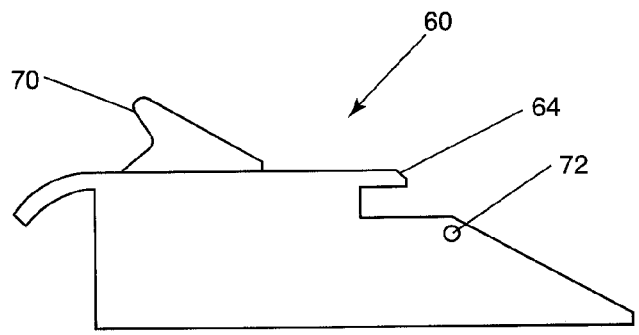
FIG. 7A is a side view of the preferred clamp adapter in a second embodiment.
Figure 7B:
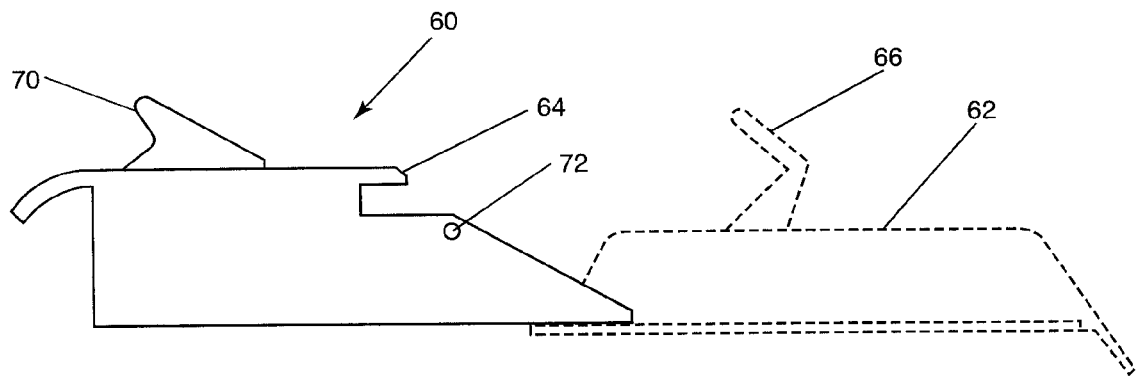
FIG. 7B is a side view of the clamp adapter of FIG. 7A being inserted onto an OEM clamp.
Figure 7C:
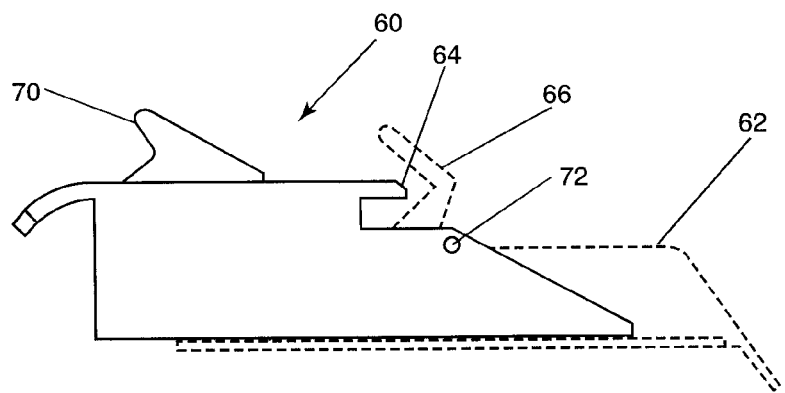
FIG. 7C is a side view of the clamp adapter after insertion over the OEM clamp.
Figure 8:
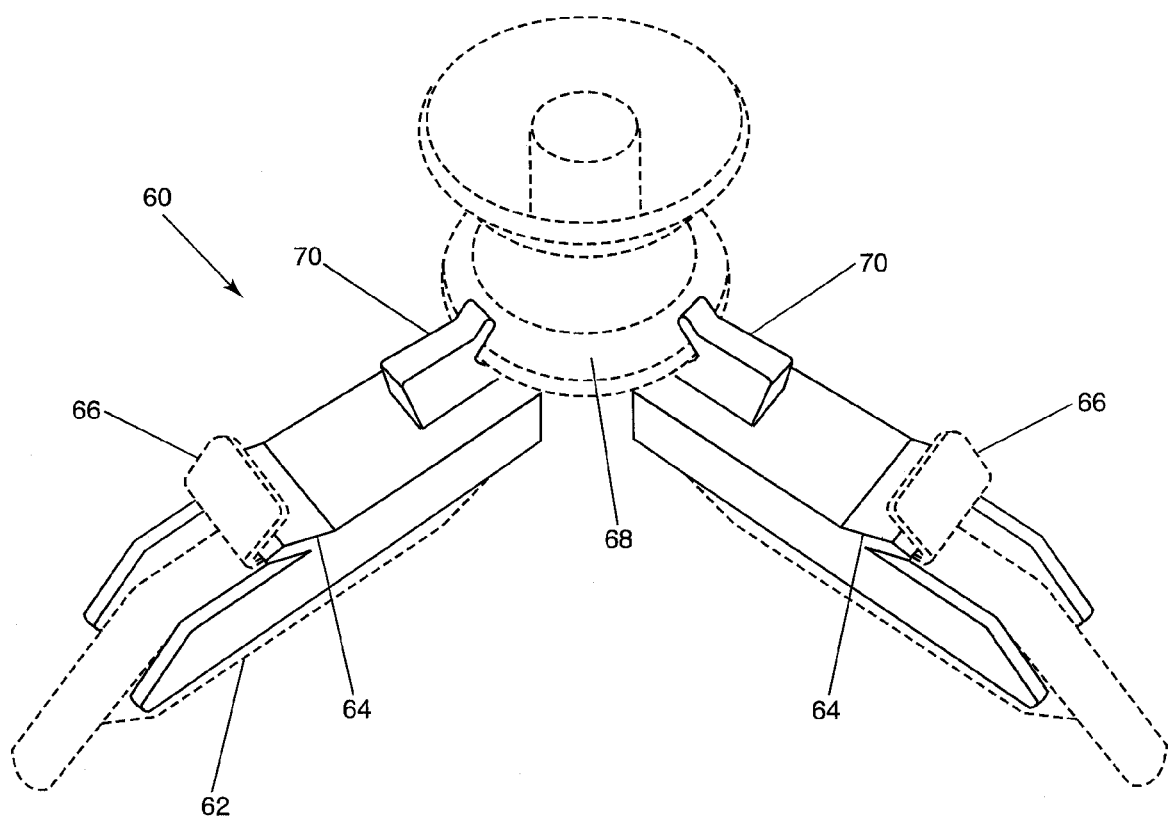
FIG. 8 is a perspective view of the inserted clamp adapters securing a wheel assembly.

A second embodiment for tire machine clamp adapters is shown in FIGS. 7A, 7B, 7C, and 8. Clamp feet adapters 60 are configured to slip over existing or OEM clamps 62. Typical tire machines are designed to fit standard automobile and light truck tires so the clamping mechanisms cannot clamp onto smaller wheel assemblies. By using clamp adapters 60, a typical tire machine can be used to clamp and hold wheel assemblies as small as four-inch (4") wheels. Each clamp foot adapter 60 slides over the OEM clamp 62. Clamp adapter is configured to fit over OEM clamp and a stop hook 64 engages OEM clamp hook 66, as shown. When the clamping mechanism is engaged, OEM clamp hook 66 pushes against stop hook 64, thus, forcing clamp adapter to squeeze against rim edge 68, as shown in FIG. 8. A raised adapter hook 70 is affixed to each clamp adapter 60 that is configured to hook onto rim edge 68 upon engagement of the clamping mechanism. Upon retraction of the clamping mechanism, reverse stop 72 engages OEM clamp 62, which retracts clamp adapter 60 and disengages adapter hook 70 from rim edge 68. Reverse stop 72 is preferably a set screw or similar device that protrudes to the interior of the clamp adapter and engages the rear portion of the OEM clamp hook when the tire machine is deactivated and raised adapter hook 70 is engaged. These clamp adapters allow the OEM clamping mechanisms to clamp and hold smaller wheel assemblies simply by inserting them over the OEM clamps and require no bolting or significant assembly.

Referring again to FIGS. 7A, 7B, 7C, and 8, the method and system for using the clamp adapter for mounting or demounting is similar to the description above with the addition of the following procedure. If handling a smaller tire, such as a four-inch (4") through ten-inch (10") wheel assembly, clamp adapters 60 are inserted over each OEM clamp 62 onto the rim of the tires, as shown in FIGS. 7A, 7B, and 7C. Clamp adapter 60 is slid over the existing OEM foot clamp 62 until stop hook 64 is abutted against the existing rim clamp notch or hook 66. Reverse stop 72 is then inserted to catch the rear portion of hook 66 to pull the clamp adapter away from wheel assembly 68 when the tire machine is deactivated. This step is repeated for each foot clamp. This is a unique and removable step down system that will allow an existing tire machine to mount and demount smaller tires. This system is removable when working on anything larger than a ten-inch (10") wheel assembly.

Although the claimed invention has been described in detail with particular reference to these preferred embodiments, other embodiments can achieve the same results. Variations and modifications of the presently claimed invention will be obvious to those skilled in the art and it is intended to cover in all such modifications and equivalents. The entire disclosures of all references, applications, patents, and publications cited above, are hereby incorporated by reference.

What is claimed is:

1. A tire machine adapter for connection to an existing tire machine having a plurality of tire clamps to extend a range of reach for small wheel assemblies, the tire machine adapter comprising:
   a guide having a plurality of linear arms;
   a plurality of clamp adapters configured to connect to each respective tire clamp, wherein each clamp adapter is configured to slide along a respective linear arm of the guide;
   a tongue and a retracting adjustable clip disposed on each clamp adapter for respectively engaging substantially opposite facing surfaces on each tire clamp; and
   a rim edge hooking structure disposed on each clamp adapter.

2. The tire machine adapter of claim 1 wherein the guide comprises a cross shaped guide with four arms.

3. The tire machine adapter of claim 1 wherein each clamp adapter comprises a sleeve disposed on each clamp adapter having a cross-section dimensioned larger than the cross-section of each respective arm.

4. The tire machine adapter of claim 1 wherein the retracting adjustable clip comprises a pivoting deactivating bar for engaging a hack end of a catch on each respective tire clamp.

5. The tire machine adapter of claim 1, wherein the rim edge hooking structure comprises a V shaped member configured to engage the rim edge.

6. The tire machine adapter of claim 1, wherein the rim hooking structure comprises two V shaped members spaced apart in a predetermined dimension.

7. A method for clamping a small wheel assembly on an existing tire machine having a plurality of tire clamps, the method comprising the steps of:
   providing a tire machine adapter comprising a guide having a plurality of linear arms, a plurality of clamp adapters configured to connect to each respective tire clamp and to extend a range of reach for small wheel assemblies, wherein each clamp adapter is configured to slide along a respective arm of the guide, tongue and a retracting adjustable dip disposed on each clamp adapter for respectively engaging substantially opposite facing surfaces on each tire clamp and a rim edge hooking structure disposed on each clamp adapter;
   placing the tire machine adapter over the tire clamps whereby each clamp adapter is aligned with each respective tire clamp;
   activating the tire machine;
   pushing the tongue on each clamp adapter to engage a catch in the each OEM tire machine clamp; engaging a rim edge on the small wheel assembly by the hooking structure; and centering and holding the wheel assembly.

8. The method of claim 7 further comprising disengaging the wheel assembly via the tire clamp by pushing the retracting adjustable clip with a surface of the tire clamp.

9. The method of claim 8 further comprising the step of pivoting the retracting adjustable clip.

10. The method of claim 7 wherein the step of centering and holding comprises sliding each clamp adapter along respective linear arms disposed on the guide.

11. The method of claim 7 wherein the step of engaging a rim edge with a hooking structure comprises engaging two V shaped members disposed on each clamp adapter.

* * * * *